United States Patent
Hottovy et al.

(10) Patent No.: US 9,718,948 B2
(45) Date of Patent: *Aug. 1, 2017

(54) SYSTEM AND METHOD FOR CLOSED RELIEF OF A POLYOLEFIN LOOP REACTOR SYSTEM

(71) Applicant: Chevron Phillips Chemical Company LP, The Woodlands, TX (US)

(72) Inventors: John D. Hottovy, Kingwood, TX (US); Richard Peacock, Missouri City, TX (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 157 days.

This patent is subject to a terminal disclaimer.

(21) Appl. No.: 14/737,020

(22) Filed: Jun. 11, 2015

(65) Prior Publication Data

US 2015/0284551 A1    Oct. 8, 2015

Related U.S. Application Data

(63) Continuation of application No. 14/203,842, filed on Mar. 11, 2014, which is a continuation of application
(Continued)

(51) Int. Cl.
*B01J 19/00* (2006.01)
*C08L 23/06* (2006.01)
(Continued)

(52) U.S. Cl.
CPC ............. *C08L 23/06* (2013.01); *B01J 19/002* (2013.01); *B01J 19/0006* (2013.01);
(Continued)

(58) Field of Classification Search
CPC ..... C08L 23/06; B01J 19/0006; B01J 19/002; B01J 19/1837; B01J 19/2455; C08F 2/01; C08F 10/00
(Continued)

(56) References Cited

U.S. PATENT DOCUMENTS 3,244,681 A * 4/1966 Marwil .................... B01J 3/002
                                                          526/64
6,121,179 A * 9/2000 McBrayer, Jr. ........ C01B 31/087
                                                          423/460
(Continued)

FOREIGN PATENT DOCUMENTS

| WO | 2004109417 A2 | 12/2004 |
| WO | 2011095532 A1 | 8/2011 |
| WO | 2011162961 A1 | 12/2011 |

OTHER PUBLICATIONS

"ASME International, "Rules for Construction of Pressure Vessels", 3 pages, Jul. 1, 2006, The American Society of Mechanical Engineers, New York, New York.".
(Continued)

*Primary Examiner* — Walter D Griffin
*Assistant Examiner* — Huy-Tram Nguyen
(74) *Attorney, Agent, or Firm* — Eversheds Sutherland (US) LLP

(57) ABSTRACT

A reactor system including an enclosed pressure relief system and/or a control system. The enclosed pressure relief system including a slurry separation system communicatively coupled with a pressure relief valve coupled to a loop reactor such that activation of the pressure relief valve results in discharge of a slurry from the loop reactor to the slurry separation system, wherein the slurry separation system is capable of separating solid and liquid components
(Continued)

from gas components of the slurry and transmitting the gas components to a flare via a flare header.

25 Claims, 8 Drawing Sheets

Related U.S. Application Data

No. 12/819,641, filed on Jun. 21, 2010, now Pat. No. 8,703,063.

(51) Int. Cl.
*C08F 2/01* (2006.01)
*C08F 10/00* (2006.01)
*B01J 19/18* (2006.01)
*B01J 19/24* (2006.01)
*C08F 210/16* (2006.01)

(52) U.S. Cl.
CPC ....... *B01J 19/1837* (2013.01); *B01J 19/2455* (2013.01); *C08F 2/01* (2013.01); *C08F 10/00* (2013.01); *B01J 2219/0027* (2013.01); *B01J 2219/00162* (2013.01); *B01J 2219/24* (2013.01); *C08F 210/16* (2013.01)

(58) Field of Classification Search
USPC .......................................................... 422/132
See application file for complete search history.

(56) References Cited

U.S. PATENT DOCUMENTS

| | | | | |
|---|---|---|---|---|
| 8,703,063 | B2* | 4/2014 | Hottovy | B01J 19/1837 422/117 |
| 9,295,964 | B2* | 3/2016 | Nguyen | B01J 19/002 |
| 2004/0083028 | A1* | 4/2004 | Vaidyanathan | B01J 8/10 700/269 |
| 2006/0042696 | A1* | 3/2006 | Martin | F16K 17/02 137/529 |
| 2008/0171838 | A1* | 7/2008 | Fouarge | B01J 8/003 526/64 |
| 2011/0311014 | A1* | 12/2011 | Hottovy | B01J 19/1837 376/283 |
| 2015/0080533 | A1† | 3/2015 | Nguyen | |

OTHER PUBLICATIONS

Notice of Third Party Submission dated Jun. 16, 2015, in corresponding U.S. Appl. No. 14/031,183, 22 pgs.

\* cited by examiner
† cited by third party

SYSTEM AND METHOD FOR CLOSED RELIEF OF A POLYOLEFIN LOOP REACTOR SYSTEM

CROSS-REFERENCE TO RELATED APPLICATIONS

This application is a continuation of U.S. patent application Ser. No. 14/203,842, filed Mar. 11, 2014, which is a continuation of application Ser. No. 12/819,641, filed Jun. 21, 2010, now U.S. Pat. No. 8,703,063 entitled "System and Method for Closed Relief of a Polyolefin Loop Reactor System" all of which are incorporated herein by reference.

BACKGROUND

Technical Field

The present techniques relate generally to the production of polyolefin, and more particularly, to an improved pressure relief system for a polyolefin loop reactor.

Description of the Related Art

This section is intended to introduce the reader to aspects of art that may be related to aspects of the present embodiments, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

As chemical and petrochemical technologies have advanced, the products of these technologies have become increasingly prevalent in society. In particular, as techniques for bonding simple molecular building blocks into longer chains (or polymers) have advanced, the polymer products, typically in the form of various plastics, have been increasingly incorporated into various everyday items. For example, polyolefin polymers, such as polyethylene, polypropylene, and their copolymers, are used for retail and pharmaceutical packaging, food and beverage packaging (such as juice and soda bottles), household containers (such as pails and boxes), household items (such as appliances, furniture, carpeting, and toys), automobile components, pipes, conduits, and various industrial products.

Specific types of polyolefins, such as high-density polyethylene (HDPE), have particular applications in the manufacture of blow-molded and injection-molded goods, such as food and beverage containers, film, and plastic pipe. Other types of polyolefins, such as low-density polyethylene (LDPE), linear low-density polyethylene (LLDPE), isotactic polypropylene (iPP), and syndiotactic polypropylene (sPP) are also suited for similar applications. The mechanical requirements of the application, such as tensile strength and density, and/or the chemical requirements, such thermal stability, molecular weight, and chemical reactivity, typically determine what type of polyolefin is suitable.

One benefit of polyolefin construction, as may be deduced from the list of uses above, is that it is generally non-reactive with goods or products with which it is in contact. This allows polyolefin products to be used in residential, commercial, and industrial contexts, including food and beverage storage and transportation, consumer electronics, agriculture, shipping, and vehicular construction. The wide variety of residential, commercial and industrial uses for polyolefins has translated into a substantial demand for raw polyolefin which can be extruded, injected, blown or otherwise formed into a final consumable product or component.

To satisfy this demand, various processes exist by which olefins may be polymerized to form polyolefins. Typically, these processes are performed at petrochemical facilities, which have ready access to the short-chain olefin molecules (monomers and comonomers) such as ethylene, propylene, butene, pentene, hexene, octene, decene, and other building blocks of the much longer polyolefin polymers. These monomers and comonomers may be polymerized in a liquid-phase polymerization reactor and/or gas-phase polymerization reactor to form a product comprising polymer (polyolefin) solid particulates, typically called fluff or granules. The fluff may possess one or more melt, physical, rheological, and/or mechanical properties of interest, such as density, melt index (MI), melt flow rate (MFR), copolymer content, comonomer content, modulus, and crystallinity. The reaction conditions within the reactor, such as temperature, pressure, chemical concentrations, polymer production rate, and so forth, may be selected to achieve the desired fluff properties.

In addition to the one or more olefin monomers, a catalyst for facilitating the polymerization of the monomers may be added to the reactor. For example, the catalyst may be a particle added via a reactor feed stream and, once added, suspended in the fluid medium within the reactor. An example of such a catalyst is a chromium oxide containing hexavalent chromium on a silica support. Further, a diluent may be introduced into the reactor. The diluent may be an inert hydrocarbon, such as isobutane, propane, n-pentane, i-pentane, neopentane, and n-hexane, which is liquid at reaction conditions. However, some polymerization processes may not employ a separate diluent, such as in the case of selected examples of polypropylene production where the propylene monomer itself acts as the diluent.

The discharge of the reactor typically includes the polymer fluff as well as non-polymer components, such as unreacted olefin monomer (and comonomer), diluent, and so forth. In the case of polyethylene production, the non-polymer components typically comprise primarily diluent, such as isobutane, having a small amount of unreacted ethylene (e.g., 5 wt. %). This discharge stream is generally processed, such as by a diluent/monomer recovery system, to separate the non-polymer components from the polymer fluff. The recovered diluent, unreacted monomer, and other non-polymer components from the recovery system may be treated, such as by treatment beds and/or a fractionation system, and ultimately returned as purified or treated feed to the reactor. Some of the components may be flared or returned to the supplier, such as to an olefin manufacturing plant or petroleum refinery. As for the recovered polymer (solids), the polymer may be treated to deactivate residual catalyst, remove entrained hydrocarbons, dry the polymer, and pelletize the polymer in an extruder, and so forth, before the polymer is sent to customer.

The competitive business of polyolefin production drives manufacturers to continuously improve their processes in order to increase production, lower production costs, and so on. One need that relates to the manufacture of polyethylene is to improve pressure relief features throughout the process at a reasonable cost. Specifically, it is now recognized that it may be desirable to improve pressure relief features of the reactor by enclosing the relief system.

BRIEF DESCRIPTION OF THE DRAWINGS

Advantages of the techniques may become apparent upon reading the following detailed description and upon reference to the drawings in which.

DETAILED DESCRIPTION OF SPECIFIC EMBODIMENTS

Figure 1:
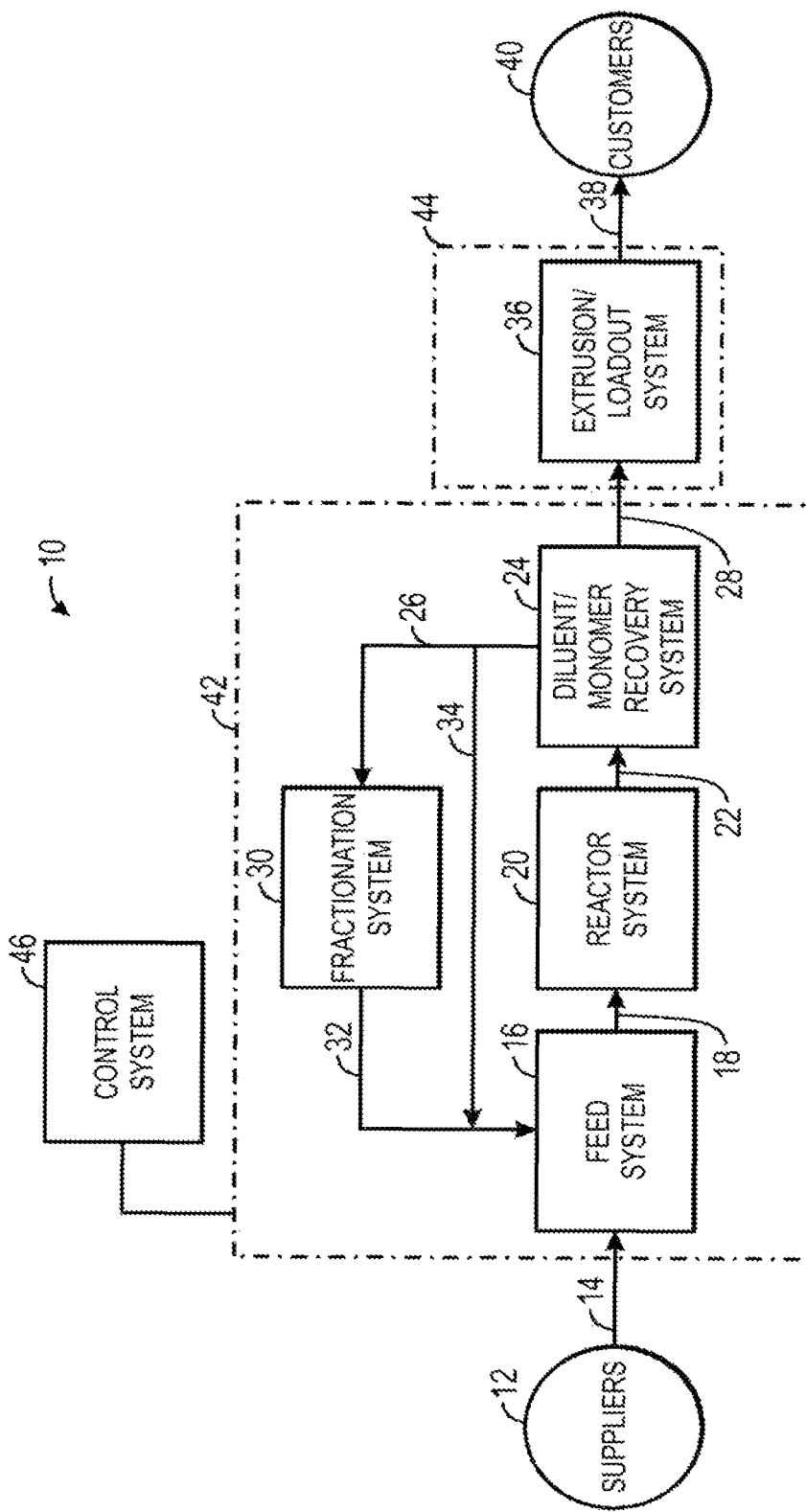
FIG. 1 is a block flow diagram depicting an exemplary polyolefin manufacturing system for producing polyolefins in accordance with one embodiment of the present techniques.

One or more specific embodiments of the present disclosure will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present techniques relate to improving the relief system of a loop reactor by installing a closed reactor relief system (CRRS). Many polyethylene and polypropylene loop reactors throughout the world have relief valves that discharge directly to the atmosphere. This is generally not a problem because reactors such as these rarely have a relief system discharge. Further, when such a discharge occurs, the resulting vapor cloud disperses rapidly. However, while these existing systems meet operational standards, it is now recognized that existing systems may be improved upon in certain situations by containment of the loop reactor relief system discharge. For example, present embodiments are directed to containing potential discharges of the loop reactor's pressure relief system to a plant flare system. This may be an efficient manner of handling reactor relief material. With regard to this approach, it is now recognized that issues may arise with handling the solids from the reactor without plugging up the relief line of the flare during a relief scenario. Accordingly, present embodiments address this issue by incorporating features for separation of slurry components that may be vented during a relief scenario. For example, features such as a dedicated cyclone vessel incorporated into the relief system may be included in present embodiments, as will be discussed in detail below. As will also discussed in detail below, present embodiments may include a relief instrument system (RIS) that may be employed to drastically reduce the potential size of relief scenarios and the probability of potential relief scenarios reaching "upset reactor" conditions and so forth.

To facilitate discussion of the present techniques and to provide an extensive discussion of the entire related process, the disclosure is presented in sections. Section I introduces an exemplary polyolefin production process, which includes a feed system, reactor system, fractionation system, diluent/monomer recovery system, and extrusion/loadout system. Section I provides examples of polyolefin applications and end-uses, and discusses exemplary control of a polyolefin production process. Section II discusses the exemplary reactor system, including features such as a CRRS and control mechanisms for avoiding pressure relief issues. Section III discusses an exemplary diluent/monomer recovery system, which receives a reactor discharge (effluent). Section IV discusses a fractionation system for processing recycled diluent.

I. Polyolefin Production Process—An Overview

Turning now to the drawings, and referring initially to FIG. 1, a block diagram depicts an exemplary manufacturing process 10 for producing polyolefins, such as polyethylene, polypropylene, and/or their copolymers. The exemplary manufacturing process 10 is typically a continuous operation but may include both continuous and batch systems. An exemplary nominal capacity for the exemplary manufacturing process 10 is about 400-800 million pounds of polyolefin produced per year. Exemplary hourly design rates are approximately 50,000 to 100,000 pounds of polymerized/extruded polyolefin per hour. It should be emphasized, however, that the present techniques apply to polyolefin manufacturing processes having nominal capacities and design rates outside of these exemplary ranges.

Various suppliers 12 may provide reactor feedstocks 14 to the manufacturing system 10 via pipeline, trucks, cylinders, drums, and so forth. The suppliers 12 may comprise off-site and/or on-site facilities, including olefin plants, refineries, catalyst plants, and the like. Examples of possible feedstocks include olefin monomers and comonomers (such as ethylene, propylene, butene, hexene, octene, and decene), diluents (such as propane, isobutane, n-hexane, and n-heptane), chain transfer agents (such as hydrogen), catalysts (such as Ziegler-Natta catalysts, chromium catalysts, and metallocene catalysts), co-catalysts (such as triethylaluminum, triethylboron, and methyl aluminoxane), and other additives. In the case of ethylene monomer, exemplary ethylene feedstock may be supplied via pipeline at approximately 800-1450 pounds per square inch gauge (psig) at 45-65° F. Exemplary hydrogen feedstock may also be supplied via pipeline, but at approximately 900-1000 psig at 90-110° F. Of course, a variety of supply conditions may exist for ethylene, hydrogen, and other feedstocks 14.

A. Feed System

The suppliers 12 typically provide feedstocks 14 to a reactor feed system 16, where the feedstocks 14 may be stored, such as in monomer storage and feed tanks, diluent vessels, catalyst tanks, co-catalyst cylinders and tanks, and so forth. In the feed system 16, the feedstocks 14 may be treated or processed prior to their introduction as feed 18 into the polymerization reactors of a reactor system 20. For example, feedstocks 14, such as monomer, comonomer, and diluent, may be sent through treatment beds (e.g., molecular sieve beds, aluminum packing, etc.) to remove catalyst poisons. Such catalyst poisons may include, for example, water, oxygen, carbon monoxide, carbon dioxide, and organic compounds containing sulfur, oxygen, or halogens. The olefin monomer and comonomers may be liquid, gaseous, or a supercritical fluid, depending on the type of reactor being fed.

Also, it should be noted that typically only a relatively small amount of fresh make-up diluent as feedstock 14 is utilized, with a majority of the diluent fed to the polymerization reactor recovered from the reactor effluent. Moreover, techniques relating to the use of diluent and olefin-free diluent (processed from the reactor effluent) may improve operation of the reactor, and reduce operating and capital costs of the polyolefin manufacturing process 10.

The feed system 16 may prepare or condition other feedstocks 14, such as catalysts, for addition to the polymerization reactors. For example, a catalyst may be activated and then mixed with diluent (e.g., isobutane or hexane) or mineral oil in catalyst preparation tanks. Further, the feed system 16 typically provides for metering and controlling the addition rate of the feedstocks 14 into the polymerization reactor to maintain the desired reactor stability and/or to achieve the desired polyolefin properties or production rate. Furthermore, in operation, the feed system 16 may also store, treat, and meter recovered reactor effluent for recycle to the reactor. Indeed, operations in the feed system 16 generally receive both feedstock 14 and recovered reactor effluent streams. In total, the feedstocks 14 and recovered reactor effluent are processed in the feed system 16 and fed as feed streams 18 (e.g., streams of monomer, comonomer, diluent, catalysts, co-catalysts, hydrogen, additives, or combinations thereof) to the reactor system 20. As discussed below, the streams 18 may be t10 delivered in feed conduits to the reactor which tap into the wall of the polymerization reactor in the reactor system 20.

B. Reactor System

The reactor system 20 may comprise one or more reactor vessels, such as liquid-phase or gas-phase reactors. The reactor system 20 may also comprise a combination of liquid and gas-phase reactors. If multiple reactors comprise the reactor system 20, the reactors may be arranged in series, in parallel, or in any other suitable combination or configuration. In the polymerization reactor vessels, one or more olefin monomers are polymerized to form a product comprising polymer particulates, typically called fluff or granules. The fluff may possess one or more melt, physical, rheological, and/or mechanical properties of interest, such as density, melt index (MI), melt flow rate (MFR), copolymer or comonomer content, modulus, and crystallinity. The reaction conditions, such as temperature, pressure, flow rate, mechanical agitation, product takeoff, component concentrations, polymer production rate, and so forth, may be selected to achieve the desired fluff properties.

In addition to the one or more olefin monomers, a catalyst that facilitates polymerization of the monomer is typically added to the reactor. The catalyst may be a particle suspended in the fluid medium within the reactor. In general, Ziegler catalysts, Ziegler-Natta catalysts, metallocenes, and other well-known polyolefin catalysts, as well as co-catalysts, may be used. An example of such a catalyst is a chromium oxide catalyst containing hexavalent chromium on a silica support. Typically, an olefin free diluent or mineral oil, for example, is used in the preparation and/or delivery of the catalyst in a feed conduit that taps into the wall of the polymerization reactor.

Further, diluent may be fed into the reactor, typically a liquid-phase reactor. The diluent may be an inert hydrocarbon that is liquid at reaction conditions, such as isobutane, propane, n-pentane, i-pentane, neopentane, n-hexane, cyclohexane, cyclopentane, methylcyclopentane, ethylcyclohexane, and the like. The purpose of the diluent is generally to suspend the catalyst particles and polymer within the reactor. Diluent, as indicated, may also be used for reactor flushes. Some polymerization processes may not employ a separate diluent, such as in the case of selected polypropylene production where the propylene monomer itself may act as the diluent. In this case, the propylene, propane, inert compound or other compounds may provide for reactor flushes.

A motive device may be present within the reactor in the reactor system 20. For example, within a liquid-phase reactor, such as a loop slurry reactor, an impeller may create a turbulent mixing zone within the fluid medium. The impeller may be driven by a motor to propel the fluid medium as well as any catalyst, polyolefin fluff, or other solid particulates suspended within the fluid medium, through the closed loop of the reactor. Similarly, within a gas-phase reactor, such as a fluidized bed reactor or plug flow reactor, one or more paddles or stirres may be used to mix the solid particles within the reactor.

C. Diluent/Monomer Recovery, Treatment, and Recycle

A discharge 22 of the reactors within the reactor system 20 may include the polymer fluff as well as non-polymer components, such as diluent, unreacted monomer/comonomer, and residual catalyst. In certain embodiments, the discharge 22 may include a discharge nozzle and conduit installed (e.g., welded) at a tap or hole cut into a reactor wall. The discharge 22 exiting the reactor through the discharge nozzle may be subsequently processed, such as by a diluent/monomer recovery system 24, to separate non-polymer components 26 (e.g., diluent and unreacted monomer) from polymer fluff 28. The diluent/monomer may be flashed in the recovery system 24 to separate the diluent/monomer from the fluff 28.

The untreated recovered non-polymer components 26 (e.g., diluent/monomer) may be further processed, such as by a fractionation system 30, to remove undesirable heavy and light components and to produce olefin-free diluent. Fractionated product streams 32 may then be returned to the reactor system 20 via the feed system 16. On the other hand, the non-polymer components 26 may recycle more directly to the feed system 16 (as indicated by the line identified by reference numeral 34), bypassing the fractionation system 30, and thus permitting a smaller fractionation system 30. Generally, in certain technologies, at least some of the diluent is processed in a fractionation system (e.g., the fractionation system 30) to provide for catalyst preparation/delivery in the feed system 16 and reactor flushes in the reactor system 20. In certain embodiments, up to 80-95% of the diluent discharged from the reactor bypasses the fractionation system in route to the polymerization reactor. As a result, the size of the fractionation columns and associated steam consumption in the downstream fractionation system 30 may be reduced. In reducing the demand for olefin-free diluent for reactor flushes, the present techniques may further reduce the size, and capital and operating costs of the fractionation system 30. In addition, the piping systems for delivering olefin-free diluent for reactor flushes from the fractionation system 30 to the reactor system 20 may be reduced in size.

As for the fluff 28, it may be further processed within the recovery system 24 and in an extrusion/loadout system 36 to prepare it for shipment, typically as pellets 38, to customers 40. Although not illustrated, polymer granules intermediate in the recovery system 24 and typically containing active residual catalyst may be returned to the reactor system 20 for further polymerization, such as in a different type of reactor or under different reaction conditions. The polymerization and diluent recovery portions of the polyolefin manufacturing process 10 may be referred to as the "wet" end 42 or "reaction" side of the process 10, and the extrusion/loadout 36 portion of the polyolefin process 10 may be referred to as the "dry" end 44 or "finishing" side of the polyolefin process 10.

D. Extrusion/Loadout System

In the extrusion/loadout system 36, the fluff 28 is typically extruded to produce polymer pellets 38 with the desired mechanical, physical, and melt characteristics. Extruder feed may comprise additives, such as UV inhibitors and peroxides, which are added to the fluff products 28 to impart desired characteristics to the extruded polymer pellets 38. An extruder/pelletizer receives the extruder feed, comprising one or more fluff products 28 and whatever additives have been added. The extruder/pelletizer heats and melts the extruder feed, which then may be extruded (e.g., via a twin screw extruder) through a pelletizer die under pressure to form polyolefin pellets. Such pellets are typically cooled in a water system disposed at or near the discharge of the pelletizer.

In general, the polyolefin pellets may then be transported to a product load-out area where the pellets may be stored, blended with other pellets, and/or loaded into railcars, trucks, bags, and so forth, for distribution to the customers 40. In the case of polyethylene, the pellets 38 shipped to the customers 40 may include low density polyethylene (LDPE), linear low density polyethylene (LLDPE), medium density polyethylene (MDPE), high density polyethylene (HDPE), and enhanced polyethylene. The various types and grades of polyethylene pellets 38 may be marketed, for example, under the brand names Marlex® polyethylene or MarFlex™ polyethylene of Chevron-Phillips Chemical Company, LP, of The Woodlands, Tex., U.S.A.

E. Customers, Applications, and End-Uses

The polyolefin (e.g., polyethylene) pellets 38 may be used in the manufacturing of a variety of products, components, household items and other items, including adhesives (e.g., hot-melt adhesive applications), electrical wire and cable, agricultural films, shrink film, stretch film, food packaging films, flexible food packaging, milk containers, frozen-food packaging, trash and can liners, grocery bags, heavy-duty sacks, plastic bottles, safety equipment, coatings, toys and an array of containers and plastic products. Further, it should be emphasized that polyolefins other than polyethylene, such as polypropylene, may form such components and products via the processes discussed below.

Ultimately, the products and components formed from the polyolefin (e.g., polyethylene) pellets 38 may be further processed and assembled for distribution and sale to the consumer. For example, a polyethylene milk bottle may be filled with milk for distribution to the consumer, or the fuel tank may be assembled into an automobile for distribution and sale to the consumer. To form the end-products or components from the pellets 38 prior to distribution, the pellets are generally subjected to processing, such as blow molding, injection molding, rotational molding, blown film, cast film, extrusion (e.g., sheet extrusion, pipe and corrugated extrusion, coating/lamination extrusion, etc.), and so on.

1. Blow Molding, Injection Molding, and Rotational Molding

Blow molding is a process used for producing hollow plastic parts. The process typically employs blow molding equipment, such as reciprocating screw machines, accumulator head machines, and so on. The blow molding process may be tailored to meet the customer's needs, and to manufacture products ranging from the plastic milk bottles to the automotive fuel tanks mentioned above. Similarly, in injection molding, products and components may be molded for a wide range of applications, including containers, food and chemical packaging, toys, automotive, crates, caps and closures, to name a few.

Rotational molding is a high-temperature, low-pressure process used to form hollow parts through the application of heat to biaxially-rotated molds. Polyethylene pellet resins generally applicable in this process are those resins that flow together in the absence of pressure when melted to form a bubble-free part. The pellets 38, such as certain Marlex® HDPE and MDPE resins, offer such flow characteristics, as well as a wide processing window. Furthermore, these polyethylene resins suitable for rotational molding may exhibit desirable low-temperature impact strength, good load-bearing properties, and good ultraviolet (UV) stability. Accordingly, applications for rotationally-molded Marlex® resins include agricultural tanks, industrial chemical tanks, potable water storage tanks, industrial waste containers, recreational equipment, marine products, plus many more.

2. Downstream Extrusion Processes

Extrusion processes may also be used. Polyethylene pipe, for example, may be extruded from polyethylene pellet resins and used in an assortment of applications due to its chemical resistance, relative ease of installation, durability and cost advantages, and the like. Indeed, plastic polyethylene piping has achieved significant use for water mains, gas distribution, storm and sanitary sewers, interior plumbing, electrical conduits, power and communications ducts, chilled water piping, well casing, to name a few applications. In particular, high-density polyethylene (HDPE), which generally constitutes the largest volume of the polyolefin group of plastics used for pipe, is tough, abrasion-resistant and flexible (even at subfreezing temperatures). Furthermore, HDPE pipe may be used in small diameter tubing and in pipe up to more than 8 feet in diameter. In general, polyethylene pellets (resins) may be supplied for the pressure piping markets, such as in natural gas distribution, and for the non-pressure piping markets, such as for conduit and corrugated piping.

Sheet extrusion is a technique for making flat plastic sheets from a variety of pellet 38 resins. The relatively thin gauge sheets are generally thermoformed into packaging applications such as drink cups, deli containers, produce trays, baby wipe containers and margarine tubs. Other markets for sheet extrusion of polyolefin include those that utilize relatively thicker sheets for industrial and recreational applications, such as truck bed liners, pallets, automotive dunnage, playground equipment, and boats. A third use for extruded plastic sheets, for example, is in geomembranes, where flat-sheet polyethylene material is welded into large containment systems for mining applications and municipal waste disposal. Finally, polyolefin pellets may also be supplied for the extrusion coating and lamination industry.

3. Blown Film and Cast Film

The blown film process is a relatively diverse conversion system used for polyethylene. The American Society for Testing and Materials (ASTM) defines films as less than 0.254 millimeter (10 mils) in thickness. However, the blown film process can produce materials as thick as 0.5 millimeter (20 mils), and higher. Furthermore, blow molding in conjunction with monolayer and/or multilayer coextrusion technologies lay the groundwork for several applications. Advantageous properties of the blow molding products may include clarity, strength, tearability, optical properties, and toughness, to name a few. Applications may include food and retail packaging, industrial packaging, and non-packaging applications, such as agricultural films, hygiene film, and so forth.

The cast film process may differ from the blown film process through the fast quench and virtual unidirectional orientation capabilities. These characteristics allow a cast film line, for example, to operate at higher production rates while producing beneficial optics. Applications in food and retail packaging take advantage of these strengths.

F. Exemplary Control of Polyolefin Production

Process variables in the manufacturing system 10 may be controlled automatically and/or manually via valve configurations, control systems, and so on. In general, a control system, such as a processor-based system, may facilitate management of a range of operations in the polyolefin manufacturing system 10, such as those represented in FIG. 1. Polyolefin manufacturing facilities may include a central control room or location, as well as a central control system, such as a distributed control system (DCS) and/or programmable logic controller (PLC). Of course, the reactor system 20 typically employs a processor-based system, such as a DCS, and may also employ advanced process control known in the art. The feed system 16, the diluent/monomer recovery system 24, and the fractionation system 30 may also be controlled by the DCS. In the dry end 44 of the plant, the extruder and/or pellet loading operations may also be controlled via a processor-based system (e.g., DCS or PLC). A control system is generally represented in FIG. 1 by the control system 46, which may be representative of a centralized control system or control systems in any of the various systems that make up the polyolefin manufacturing system 10.

In some embodiments, the control system 46 may include a DCS. A DCS may be as simple as one PLC remotely connected to a computer located in a field office. Larger systems may be PLC based, but also consist of specially designed cabinets containing equipment used to provide input/output (I/O) and communication devices. A distributed system may allow remote nodes to operate independently of the central control facility should the facility go off line or lose communication capability. Remote nodes may store process data used to operate in the event of such a failure.

The control system or systems (e.g., the control system 46) in the manufacturing process 10 may include the appropriate hardware, software logic and code, to interface with the various process equipment, control valves, conduits, instrumentation, etc., to facilitate measurement and control of process variables, to implement control schemes, to perform calculations, and so on. A variety of instrumentation known to those of ordinary skill in the art may be provided to measure process variables, such as pressure, temperature, flow rate, and so on, and to transmit a signal to the control system, where the measured data may be read by an operator and/or used as an input in various control functions. Depending on the application and other factors, indication of the process variables may be read locally or remotely by an operator, and used for a variety of control purposes via the control system.

The control systems may be wired and/or wireless, and offer the advantage of centralized control, while retaining the capability of distributed or local control. Components may include instrumentation, remote transmitters, remote control panels (e.g., remote transmission units or RTU's), input/output (I/O) devices, communications medium (e.g., cable or wireless links, network, etc.), central control panel or facility, and so forth. The remote control panels, I/O devices, and other translation devices may interface with the process or equipment on one side, while interfacing with the control system on the other. Moreover, as indicated, the control system typically includes hardware/software for control, interface, database management, and so on. In operation, the control system may transfer data and commands using communication protocols such as Ethernet or other open standards, or a proprietary standard, depending upon the DCS vendor, for example. Proprietary protocols may require specialized equipment to perform their functions.

A polyolefin manufacturing facility typically has a control room from which the plant manager, engineer, technician, supervisor and/or operator, and so on, monitors and controls the process. When using a DCS, the control room may be the center of activity, facilitating the effective monitoring and control of the process or facility. The control room and DCS may contain a Human Machine Interface (HMI), which is a computer, for example, that runs specialized software to provide a user-interface for the control system. The HMI may vary by vendor and present the user with a graphical version of the remote process. There may be multiple HMI consoles or workstations, with varying degrees of access to data. Authorization schemes generally afford a degree of security, ensuring that only properly trained and authorized personnel operate the various parts of the facility via the HMI and control system.

Present embodiments are directed to a control system and specific control features for the reactor system 20. More specifically, present embodiments include an RIS and kill system that functions to prevent reactor fouling and other undesirable reactor conditions. As will be discussed in further detail below with regard to the polymerization reactor system 20, such a control system may implement certain interlock functions to prevent or stop the development of pressure relief issues by isolating feeds, initiating reactor kills, and so forth.

II. Polymerization Reactor System

Figure 2:
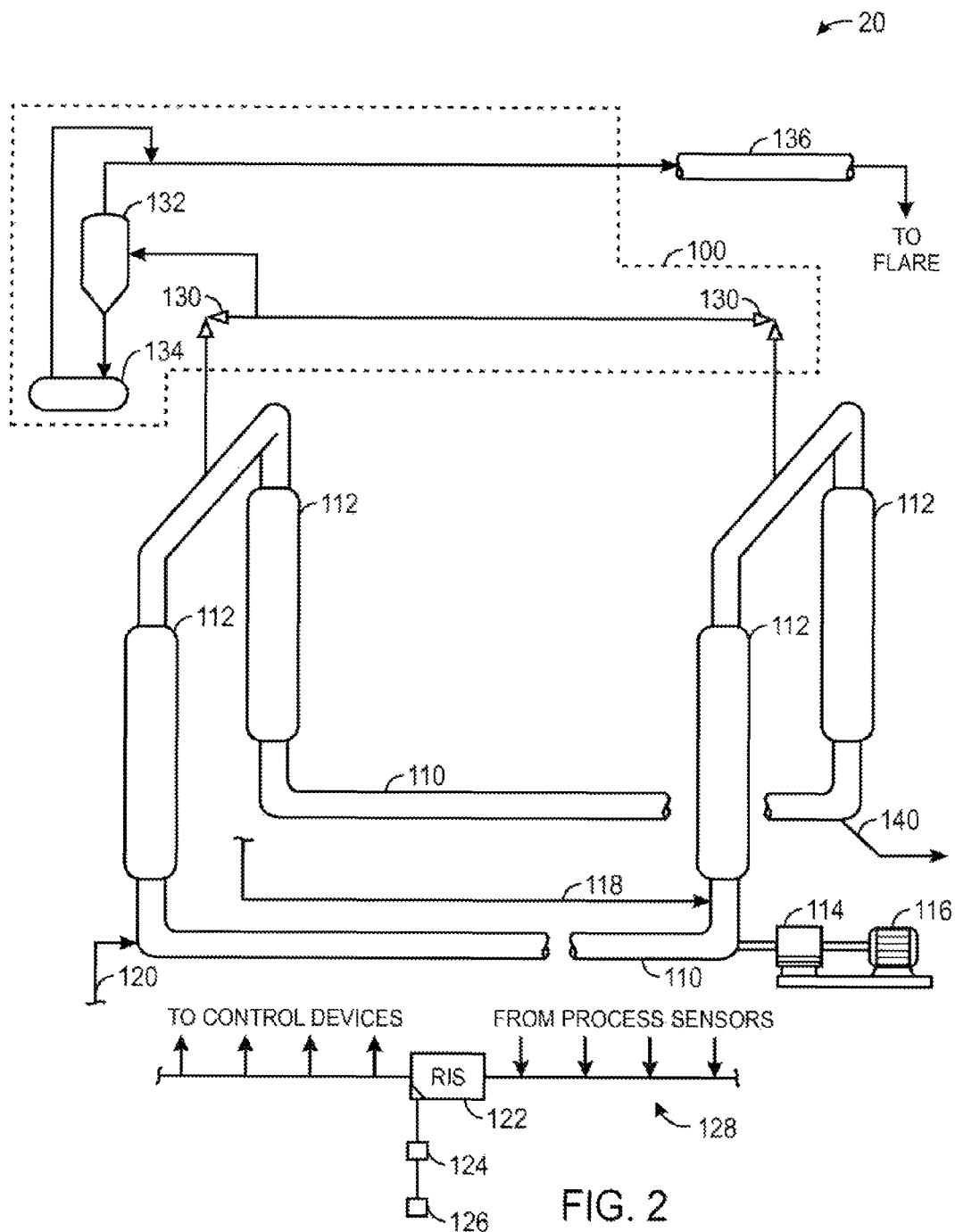
FIG. 2 is a process flow diagram of an exemplary reactor system including a closed relief system in accordance with one embodiment of the present techniques.

As indicated above, present embodiments are generally directed to improving the pressure relief system of the reactor system 20. Accordingly, FIG. 2 illustrates an exemplary polymerization reactor system 20 including a CRRS 100 in accordance with present embodiments. Specifically, referring to FIG. 2, a process flow diagram of the exemplary polymerization reactor system 20 (of FIG. 1) including the CRRS 100 is depicted. As discussed above, the reactor system 20 may comprise one or more polymerization reactors, which may in turn be of the same or different types. Furthermore, in multiple reactor systems, the reactors may be arranged serially or in parallel.

Whatever the reactor types that make up the reactor system 20, a polyolefin particulate product, generically referred to as "fluff" herein, is produced. To facilitate explanation, the following examples are limited in scope to specific reactor types believed to be familiar to those skilled in the art and to single reactors or simple combinations. To one of ordinary skill in the art using this disclosure, however, the present techniques are simply and easily applicable to more complex reactor arrangements, such as those involving additional reactors, different reactor types, and/or alternative ordering of the reactors or reactor types. Such arrangements are considered to be well within the scope of the present disclosure.

One reactor type comprises reactors within which polymerization occurs within a liquid phase. Examples of such liquid phase reactors include autoclaves, boiling liquid-pool reactors, loop slurry reactors (vertical or horizontal), and so forth. For simplicity, a loop slurry reactor 110 which produces polyolefin, such as polyethylene, polypropylene, and their copolymers, will be discussed in the context of the present techniques though it is to be understood that the present techniques are similarly applicable to other types of liquid phase reactors.

The loop slurry reactor 110 is generally composed of segments of pipe connected by smooth bends or elbows. An exemplary reactor 110 configuration includes eight jacketed vertical pipe legs, approximately 24 inches in diameter and approximately 200 feet in length, connected by pipe elbows at the top and bottom of the legs. As discussed below, reactor jackets 112 are normally provided to remove heat from the exothermic polymerization via circulation of a cooling medium, such as treated water, through the reactor jackets 112.

The reactor 110 may be used to carry out polyolefin polymerization under slurry conditions in which insoluble particles of polyolefin are formed in a fluid medium and are suspended as slurry until removed. A motive device, such as pump 114, may circulate the fluid slurry in the reactor 110. As an example, the pump 114 may include an in-line axial flow pump with the pump impeller disposed within the interior of the reactor 110 to create a turbulent mixing zone within the fluid medium. The impeller may also assist in propelling the fluid medium through the closed loop of the reactor 110 at sufficient speed to keep solid particulates, such as the catalyst or polyolefin product, suspended within the fluid medium. The pump 114 may be driven by a motor 116 or other motive force.

The fluid medium within the reactor 110 may include olefin monomers and comonomers, diluent, co-catalysts (e.g., alkyls, triethylboron, methyl aluminoxane, etc.), molecular weight control agents (e.g., hydrogen), and any other desired co-reactants or additives. Such olefin monomers and comonomers are generally 1-olefins having up to 10 carbon atoms per molecule and typically no branching nearer the double bond than the 4-position. Examples of monomers and comonomers include ethylene, propylene, butene, 1-pentene, 1-hexene, 1-octene, and 1-decene. Again, typical diluents are hydrocarbons which are inert and liquid under reaction conditions, and include, for example, isobutane, propane, n-pentane, i-pentane, neopentane, n-hexane, cyclohexane, cyclopentane, methylcyclopentane, ethylcyclohexane, and the like. These components are added to the reactor interior via inlets or conduits at specified locations, such as depicted at feed stream 118, which generally corresponds to one of the feed streams 18 of FIG. 1. Likewise, a catalyst, such as those previously discussed, may be added to the reactor 110 via a conduit at a suitable location, such as depicted at feed stream 120, which may include a diluent carrier and which also generally corresponds to one of the feed streams 18 of FIG. 1. Again, the conduits that feed the various components tie-in to (i.e., flange or weld to) the reactor 110. In total, the added components generally compose a fluid medium within the reactor 110 within which the catalyst is a suspended particle.

The reaction conditions, such as temperature, pressure, and reactant concentrations, are regulated (e.g., via a reactor controller, such as a DCS) to facilitate the desired properties and production rate of the polyolefin in the reactor 110, to control stability of the reactor 110, and the like. This control may be achieved by linking various sensors and control devices to a control system (e.g., control system 46) for reactor control. Temperature is typically maintained below that level at which the polymer product would go into solution. As indicated, due to the exothermic nature of the polymerization reaction, a cooling fluid may be circulated through jackets 112 around portions of the loop slurry reactor 110 to remove excess heat, thereby maintaining the temperature within the desired range, generally between 150° F. to 250° F. (65° C. to 121° C.). Likewise, pressure may be regulated within a desired pressure range, generally 100 psig to 800 psig, with a range of 450-700 psig being typical.

It should be noted that, in accordance with present embodiments, the maximum allowed working pressure (MAWP) of the reactor 110 may be higher than the maximum pressure of the feed system 16. This eliminates certain scenarios and minimizes other scenarios where the feed system 16 can cause a pressure relief scenario in the reactor 110 by its supply pressure. The design of the reactor 110 begins with physical construction and rating of the loop reactor vessel itself. The use of rolled plate construction may enable consistency in wall thickness of the loop reactor vessel compared with seamless pipe construction. This consistency in thickness enables the loop reactor vessel to be rated at a higher pressure than seamless pipe would be rated at the same average wall thickness under ASME Section VIII. In accordance with present embodiments, the pressure rating of the reactor 110 should be as high as possible for a given wall thickness. Further, the feed system 16 should be designed to deliver feed at lower pressure than the set pressure for relief of the reactor 110 after accounting for static head differences between the reactor relief point and the reactor feed point. Hydraulic relief scenarios become less probable at higher reactor pressure ratings when feed systems are limited.

As an example, a recycle isobutene feed system for the reactor 110 may be designed in accordance with present embodiments such that the maximum head of a recycle isobutene pump at block-in condition does not exceed a reactor relief valve reseat pressure setting after accounting for static pressure difference between the elevation of the pump discharge and the reactor relief valve. Determination of the potential maximum discharge pressure should take into account a suction pressure of the recycle isobutene pump at normal operating pressure on the recycle isobutene surge vessel plus static head pressure at a normal level of the surge vessel. For example, if the reactor's relief valve reseat pressure is 840 psig at 213 ft higher than the recycle isobutene pump, the discharge pressure of the recycle isobutene pump should be less than 890 psig, allowing for reactor content slurry specific gravity of 0.54. Based on such a design and corresponding operation, the recycle isobutene pump will not cause a reactor relief event fir single failure scenarios.

Based on the implementation of pressure/temperature control features, reactor feed pressure design, and reactor pressure design, the pressure relief valve sizes and vessel sizes for the CRRS 100 may be limited or reduced relative to what their sizes would be without these measures. For example, limitation on feed pressure relative to the MAWP of the reactor 110 may eliminate a hydraulic overpressure scenario, and may limit potential release scenarios. Thus, a significant reduction in relief valve sizing and vessel sizing (e.g., the size of the cyclone vessel 132) may be obtained.

With regard to control of the reactor 110, in one embodiment, an RIS 122, which may be a component of the control system 46, may be utilized to control reaction conditions such that inefficient conditions and relief scenarios (e.g., reactor fouling and undesirable reactor conditions) may be avoided or prevented. Specifically, the RIS 122 may include a processor 124 and a memory 126 including operational logic that takes measurements acquired by process sensors disposed throughout the process and performs certain interlock functions based on the measurements by transmitting signals to operate devices (e.g., block valves) in the manufacturing system 10. The RIS 122 may send and receive signals over a network 128, which may include transmission lines and/or wireless features. Additionally, the RIS 122 may be configured to activate a kill system to stop a polymerization reaction under certain conditions. A reactor kill may include various actions taken to stop a reaction, including isolation of catalyst feed systems, closing of system motor valves, injection of kill fluid into the reactor 110 from kill pots, and so forth. It should be noted that block valves that are configured to be actuated by the RIS 122 may include position indication features that provide verification of whether the valve operated properly.

In one embodiment, the logic of the RIS 122 may include six interlocks that perform different functions based on detected process values. A first interlock may be referred to as a "high reactor pressure interlock." According to this interlock, a high pressure (e.g., a reactor pressure 15% below a reactor relief pressure) activates a reactor kill to halt any reaction taking place in the reactor 110. A second interlock may be referred to as a "high-high pressure interlock." According to the high-high pressure interlock, a high-high pressure (e.g., a reactor pressure 10% below a reactor relief pressure), which is higher than the pressure that initiates the high reactor pressure interlock, activates an isolation of the reactor feeds 18 to the reactor 110. The high-high pressure interlock may function to protect the reactor 110 as well as prevent release of hydrocarbons into the atmosphere. A third interlock may be referred to as a "high pressure isolation of jacket water heating interlock." According to this interlock, the pressure level that activates the high-high pressure interlock may cause heating to the jacket water coolant system, which includes the jackets 112, to be shut off. While the high pressure isolation of jacket water heating interlock, like the high-high pressure interlock, may be set at 10% below the reactor relief pressure and may be initiated simultaneously with the high-high pressure interlock, the reliability requirement may be lower. Thus, the output device is not redundant. Further, in some embodiments, the high pressure isolation of jacket water heating interlock may have an activation pressure level that is different from that of the high-high pressure interlock.

Both of the first two interlocks may be based on the same set of three pressure sensors. More specifically, both the first interlock and the second interlock may be based on two out of three pressure readings satisfying a pressure criteria. Additionally, the third interlock may utilize one or more of these pressure transmitters and/or a different transmitter. The pressure transmitters may be distributed around the reactor 110 in various locations. One pressure transmitter may be located adjacent to a pressure transmitter for the reactor pressure control on the primary reactor feed line with the physical location being a separate instrument tap from the reactor pressure control transmitter. This point may closely correspond to the highest pressure in the loop reactor 110. This pressure interlock point for the feed point pressure transmitter may be adjusted to compensate for the static pressure difference between the elevations of the reactor relief valve and/or rupture disk and the reactor feed nozzle. A second transmitter may be located on a flush connection at the top ell immediately above the reactor circulation pump 114. This point represents the highest pressure at the top of the reactor 110. Based on operational experience, it is now recognized that the relief valve located at this point is the most likely to relieve in the event of hydraulic overpressure. A third pressure transmitter may be located at any convenient location (e.g., a secondary top ell flush location or a secondary reactor feed nozzle location) around the loop reactor 110. This third pressure sensing point may be adjusted to account for reactor static pressure difference between the measurement location and the reactor relief valve rupture disk.

A fourth interlock may be referred to as a "high temperature interlock," which operates to isolate the ethylene feed to the reactor 110 if any two out of three temperature sensors positioned throughout the reactor 110 indicate a temperature of 235° F. or higher, or if one valid sensor indicates a temperature of 50° F. higher than any other valid and appropriate temperature sensor of the reactor 110. The isolation of the ethylene feed provided by the high temperature interlock may prevent the development of isolated high temperature spots in the reactor 110. A fifth interlock may be referred to as a "high deviation from reactor temperature control set point interlock." This interlock initiates a reactor kill if two out of three temperature sensors (e.g., resistance temperature devices) detect a positive temperature difference from the reactor temperature control set point, and, thus, may avoid a runaway reaction. Specifically, according to this interlock, a reactor kill is initiated if two of three temperature sensors of the reactor 110 indicate a temperature more than 3° F. (or approximately 3° F.) greater than a reactor set point temperature for Cr resins or more than 4° F. (or approximately 4° F.) greater than a reactor set point temperature for Metallocene resins or XPF.

The fourth and fifth interlocks may share the same temperature sensors. Further, the temperature sensors for the control instrumentation and the RIS 122 may include matched RTDs. In other words, the RTDs used for the temperature sensors may be configured to provide the same reading at the same actual temperature. In accordance with present embodiments, empirical reactor temperature data may be collected to develop a normal operating temperature offset between the RIS temperature points and reactor control temperature readings. The normal offset may be due to slight variations in reactor temperatures around the loop reactor vessel and/or differences in readings between individual RTDs. The normal operating temperature difference information may be used to develop a bias adjustment factor for the RIS temperature readings in order to normalize the temperature readings to the reactor control RTD reading. These temperature sensors may be specifically positioned in certain areas of the reactor 110 to obtain a maximum benefit.

A sixth interlock may be referred to as a "loss of reactor circulation pump interlock," which operates to initiate a reactor kill when a loss of the reactor circulation pump 114 is identified. This interlock may be based on a one out of two input voting between motor contact status and power meter reading. With regard to interlock design considerations, a low-kilowatt criteria may be selected that is above a main drive motor power draw uncoupled form the pump 114. The kilowatt target may be obtained from the reactor circulating pump vendor or developed by measuring reactor circulating pump power draw uncoupled from the reactor circulating pump 114. Further, a delayed motor trip may be implemented on the reactor circulating pump motor 116 to automatically restart the reactor circulating pump 114 in the event of a minor power interruption. In the event that the duration of any delayed trip is determined to be longer than necessary to insure a timely kill, then two power transmitters may be selected as the initiating criteria for this interlock.

In addition to the inclusion of the six interlocks discussed above, in some embodiments, certain interlocks may be specifically excluded for efficiency and improved operation, such as a "coolant pump failure interlock" and a "reactor rupture disk failure interlock." which may operate to manipulate the process (e.g., kill the reaction) in the event of a coolant pump failure or a rupture disk failure, respectively. For example, the high deviation from reactor temperature control set point interlock may detect a coolant pump failure, which generally makes the coolant pump failure interlock unnecessary, and the exclusion of the reactor rupture disk failure interlock may give operators an opportunity to achieve an orderly reactor shut-down when a small leak in the rupture disk occurs, resulting in pressurizing piping between the rupture disk and the relief valve.

In the event that a pressure relief scenario of the reactor 110 is not prevented or deterred by control features such as those discussed above, present embodiments include the CRRS 100 for relief of the pressure in the reactor 110. The CRRS 100 prevents a direct atmospheric discharge from reactor pressure relief valves (PRVs) 130, which may result in a more efficient release. As illustrated in FIG. 2, the CRRS 100 may include one or more of the PRVs 130, which may be arranged within the CRRS 100 such that they discharge into a dedicated cyclone vessel 132 that is configured to separate gas out of the gas-liquid-solid slurry typically emitted from the reactor 110 under relief conditions. After the slurry has entered the cyclone vessel 132 as a result of a relief event, the solid and liquid components of the slurry may fall into an accumulator 134 from the cyclone 132, while the gas from the slurry passes from the cyclone vessel 132 to a flare header 136. In accordance with some embodiments, the transport of the liquids and solids from the cyclone vessel 132 to the accumulator 134 may be facilitated by gravity and/or pressure. The accumulator 134 may be sized for a partial liquid-solid discharge. Indeed, the partial liquid-solid discharge has been determined to be the process relief scenario that typically produces the most liquid and solid volume plus a design factor. It should be noted that in some embodiments, the cyclone vessel 132 and the accumulator 134 are positioned a minimal distance from the reactor 110 to minimize plugging between the reactor 110 and the cyclone vessel 132 and to facilitate transport between the cyclone vessel 132 and the accumulator 134.

The PRVs 130 illustrated in FIG. 2 may be representative of multiple staged relief valves in a relief system. For example, the PRVs 130 may include multiple different relief valves that are staged from the top of each pair of reactor legs (e.g., on top of a 180° bend of all or certain legs of a loop reactor). Indeed, the PRVs 130 corresponding to each pair of reactor legs may include a first PRV configured to open at the MAWP of the reactor 110 and a second PRV configured to open at 5% above the MAWP of the reactor 110. In one embodiment, the PRVs between each reactor leg may have alternating relief set points. For example, a relief valve positioned between a first pair of reactor legs may have a different relief set point than that of the two adjacent relief valves between adjacent leg pairs. Placement of the PRVs 130 at the top of the reactor 110 may be beneficial in the event of a loss of reactor circulation and may avoid plugging.

Figure 3:
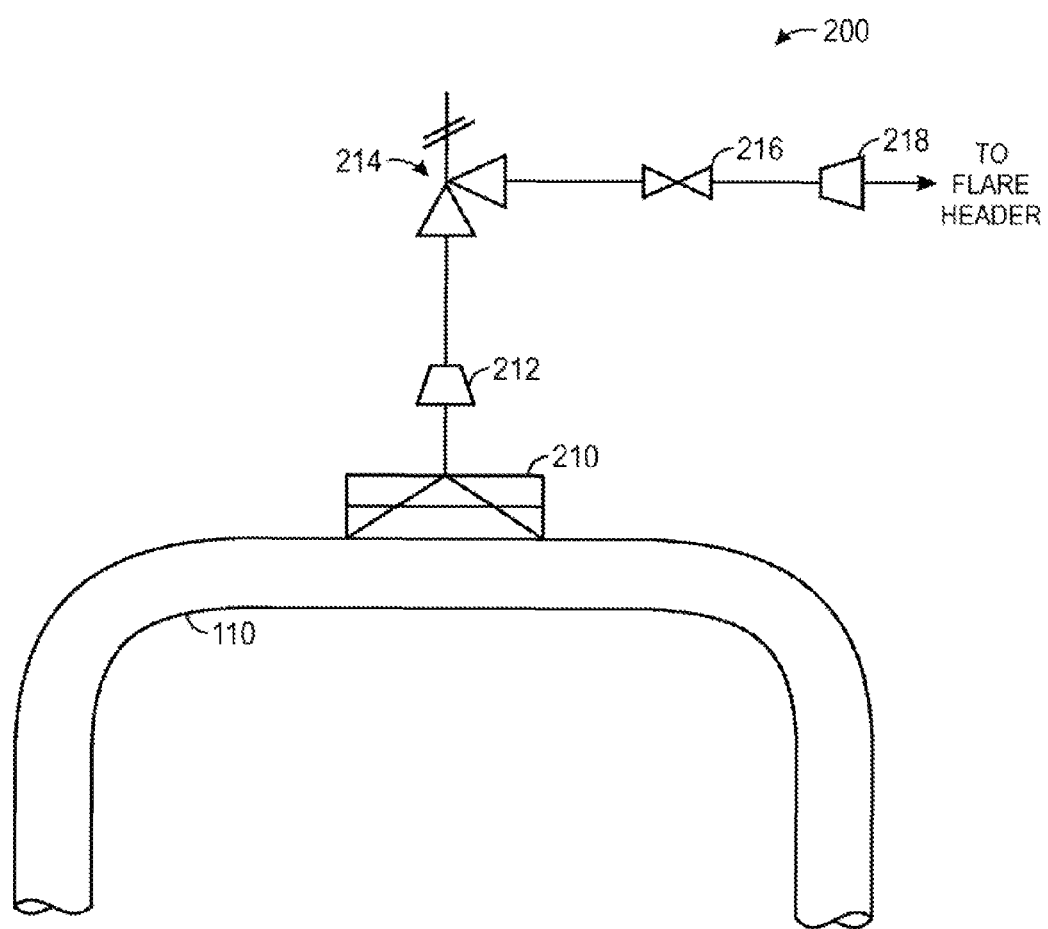
FIG. 3 is a schematic illustration of a pressure relief valve with a rupture disk in accordance with one embodiment of the present techniques.

In some embodiments, to avoid plugging, the PRVs 130 may incorporate a flush-mounted or "Top Hat" rupture disk design, as illustrated in FIG. 3. In this design, an extended rupture disk holder may be mounted in the reactor relief nozzle to bring the rupture disk as physically close as possible to the reactor wall. Specifically, FIG. 3 represents an example of a relief system 200 in accordance with present embodiments, wherein the relief system includes a Top Hat rupture disk 210 (e.g., 6 inch), a reducer 212 (e.g., 8 inch by 4 inch), a pressure relief valve 214 (e.g., a relief valve set at 950 psig or 900 psig), a car-sealed open (CSO) valve 216, and an expansion 218 (e.g., 6 inch by 10 inch) that couples to the flare header 136. As illustrated in FIG. 3, these components are coupled together to provide a relief path from the reactor 110 to the flare. It should be noted that the relief valve inlet spool may be constructed to be as short as possible to limit relief inlet pressure drop. Similarly, the discharge piping may be assembled to be as short as possible while providing a distance of 10 ft of discharge clearance above a reactor relief maintenance platform. In one embodiment, relief systems such as that illustrated in FIG. 3 may be placed on top of 180° bends of certain legs of a loop reactor, wherein the pressure relief valve 214 is set at 950 psig for certain legs, and the pressure relief valve 214 is set at 900 psig for other legs. The rupture disk may function to isolate the relief valve 214 from reactor contents while avoiding a build up of solids. Indeed, such a design may prevent accumulation of solids in the nozzles of the PRVs 130 prior to activation of the PRVs 130 in a pressure relief scenario.

It should be noted that dynamic modeling may be used to design the relief scenarios for certain reaction conditions (e.g., a runaway reaction), sizing the flare header 136, and the line sizes to assure that sufficient line velocity is in place to transport solids during a relief event. Discharge amounts may be calculated by a dynamic program called PERVS. This program may account for the dynamic expansion of the liquid and solids in the reactor as heat and mass are added and removed. In a typical case, the pressure may increase because an outlet is plugged and/or because of a temperature increase resulting from an excess of reaction which causes thermal expansion of the diluent, and to a lesser extent the solids. Such an expansion may cause a rapid pressure rise and a relief that may be handled by present embodiments.

Figure 4:
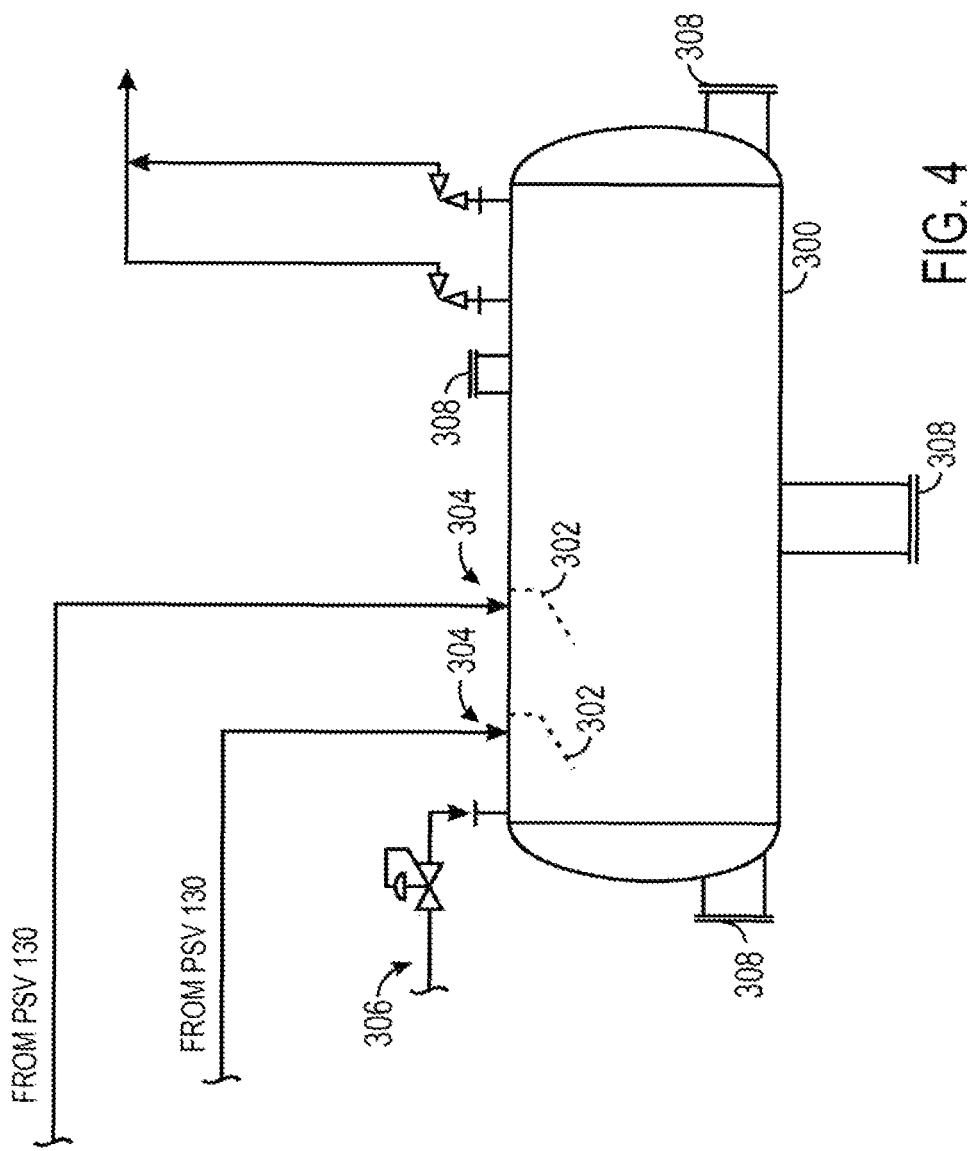
FIG. 4 is a process flow diagram of a knockout vessel positioned within an closed reactor relief system in accordance with one embodiment of the present techniques.

In some embodiments, the cyclone vessel 132 and/or the accumulator 134 may be replaced with different features. For example, FIG. 4 illustrates a knockout tank 300 that may take the place of the cyclone 132 and/or the accumulator 134. The knockout tank 300 includes deflectors 302 positioned within the knockout tank 300 near inlets 304. These deflectors 302 may function with the knockout tank 300 to keep solids out of the rest of the flare system. The knockout tank 300 may also include a sparger system 306 and various man ways 308 that may be used to clear out the knockout tank 138 in the event that solids need to be removed therefrom.

Figure 5:
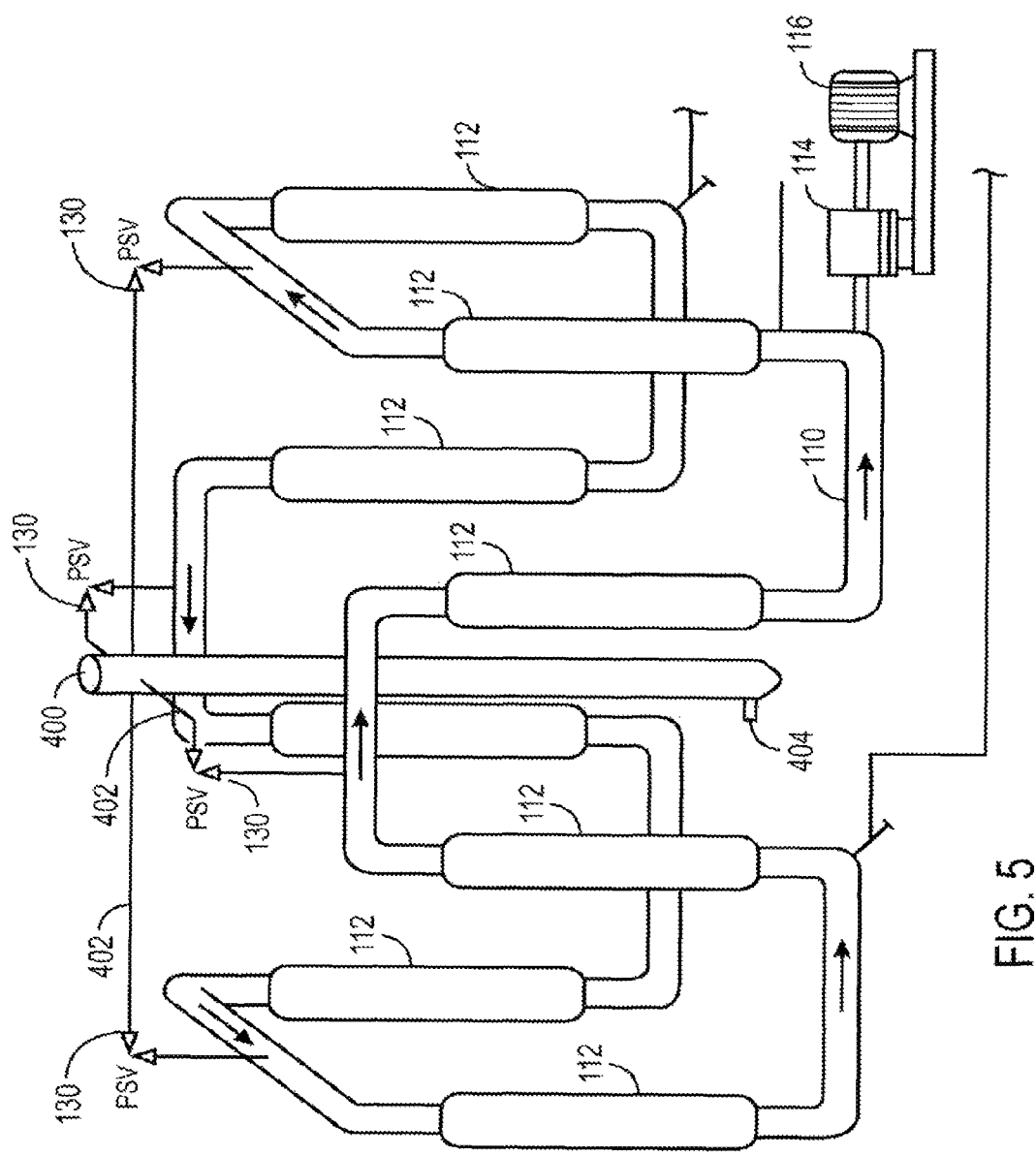
FIG. 5 illustrates a system for solids containment including an elongate containment vessel in accordance with one embodiment of the present techniques.
Figure 6:
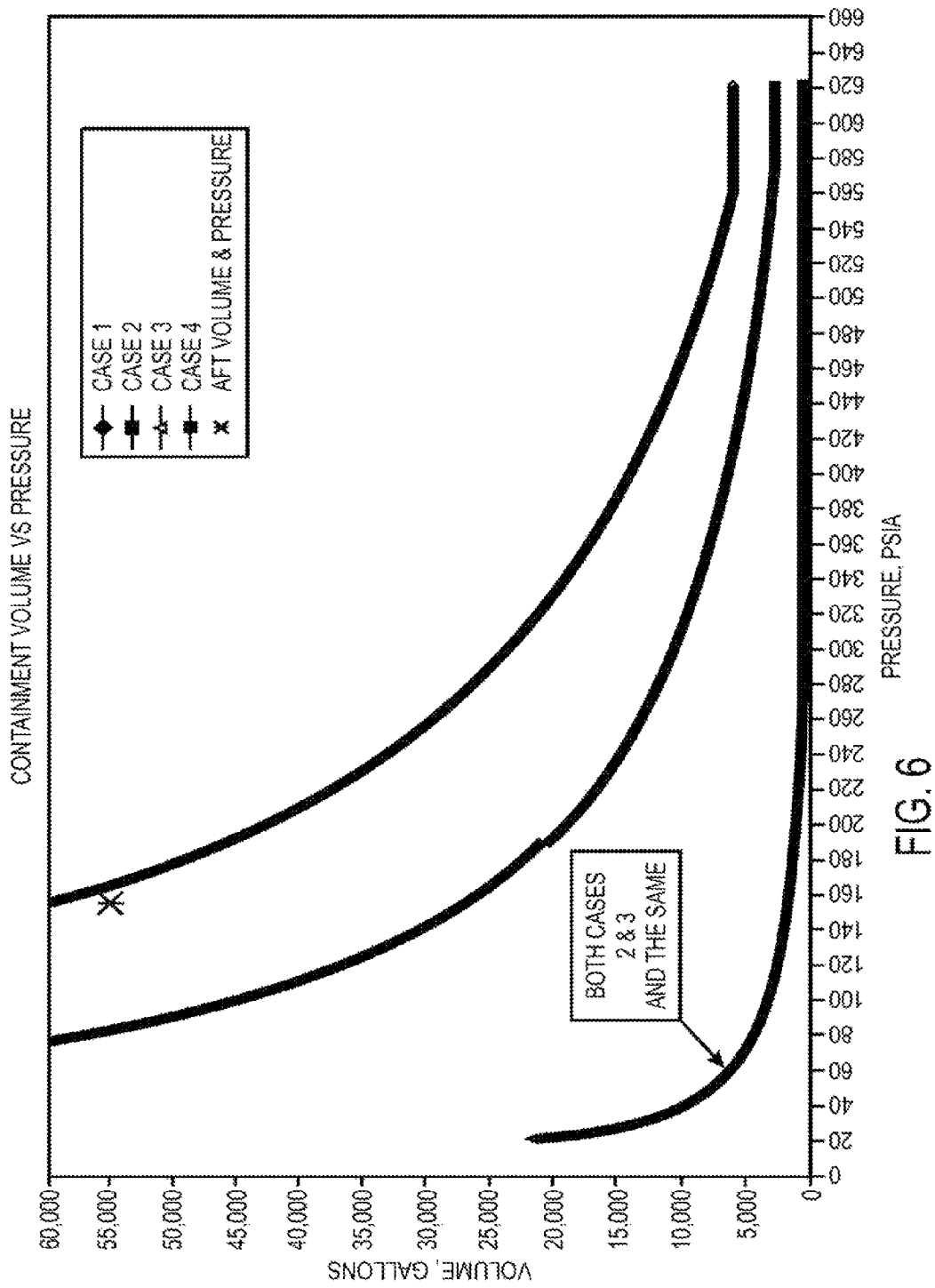
FIG. 6 includes a graph of containment volume versus pressure for a relief system employing an elongate containment vessel in accordance with one embodiment of the present techniques.

FIG. 5 illustrates another system for solids containment in accordance with present embodiments. Specifically, FIG. 5 includes an elongate solids containment vessel 400 that may be arranged between the reactor legs of the reactor 110. In the illustrated embodiment, four PRVs 130 are shown as being communicatively coupled via piping 402 to the solids containment vessel 400. Benefits of incorporating the elongate solids containment vessel 400 as illustrated in FIG. 5 include minimization of line length to the containment vessel 400 from the PRVs 130. Indeed, in some embodiments, the vessel may extend to or near the height of the PRVs 130. Further, utilization of the elongate solids containment vessel 400 may limit consumption of plant space based on the small foot print facilitated by the sizing of an elongate vessel. Additionally, inclusion of a bottom flange and/or valve 404 may facilitate cleaning of the vessel 400 when needed. The containment vessel 400 may be sized such that the relief from the PRVs 130 is sent to the containment vessel 400 and a limited amount or no gas needs to be immediately sent to flare. For example, FIG. 6 shows the calculated volume versus pressure relationship for totally containing three different scenarios which allow recovery of the relief gas or a slow venting to flare so that the size of the flare may not be increased as it may need to be to accommodate immediate venting. It should be noted that the embodiment illustrated in FIG. 5 may be incorporated with other embodiments disclosed herein.

Turning back to normal operation of the reactor system 20, as the polymerization reaction proceeds within the reactor 110, the monomer (e.g., ethylene) and comonomers (e.g., 1-hexene) polymerize to form polyolefin (e.g., polyethylene) polymers that are substantially insoluble in the fluid medium at the reaction temperature, thereby forming a slurry of solid particulates within the medium. These solid polyolefin particulates may be removed from the reactor 110 via a settling leg or other means, such as a continuous take-off, as depicted by discharge stream 140. In downstream processing, the polyethylene discharged from the reactor may be extracted from the slurry and purified.

III. Diluent/Monomer Recovery System

A. Flash Chamber

Figure 7:
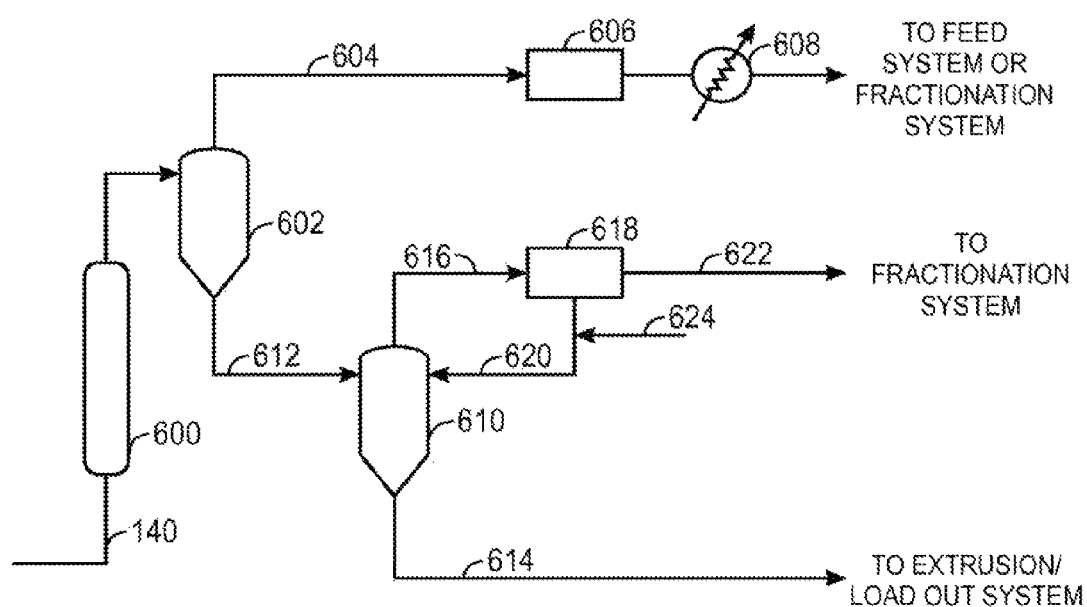
FIG. 7 is a process flow diagram of a diluent/monomer recovery system in accordance with one embodiment of the present techniques.

As illustrated by FIG. 7, the discharge 140 from the reactor 110 may flow through an in-line flash heater 600 and into a flash chamber 602. The in-line flash heater 600 may be a surrounding conduit that uses steam or steam condensate, for example, as a heating medium to provide indirect heating to the discharge 140. Thus, the loop slurry reactor 110 effluent (discharge 140) is heated prior to its introduction into the flash chamber 602. Also, before the discharge 140 enters the flash chamber 602, water or other catalysts poisons may be injected into the discharge 140 to deactivate any residual catalysts in the discharge 140 stream. Because these injected components are catalysts poisons by definition, they are typically completely removed, or at least substantially removed, from any recovered material (e.g., monomer or diluent) recycled to the reactor 110.

In the flash chamber 602, most of the non-solid components of the reactor discharge 140 are withdrawn overhead as vapor in the flash gas 604. It should be noted that it is this recycled flash gas 604 that may be condensed and bypass the fractionation system 30 in route to the reactor 110 (i.e., via the feed system 16). On the other hand, all or a portion of the flash gas 604 (as vapor and/or liquid) may be sent to the fractionation system 30. In polyethylene production, this vapor is typically primarily diluent, such as isobutane or other diluents previously mentioned. It may also contain most of the unreacted monomer (e.g., ethylene) and other light components, as well as unreacted comonomer (e.g., 1-hexene, butene, 1-pentene, 1-octene, and 1-decene) and other heavy components (e.g., hexane and oligomers). In general light components or "lights" may be defined as those light components with lower boiling points than the diluent employed. In contrast heavy components or "heavies" may be defined as those components having higher boiling points than the diluent. An exemplary approximate composition of the flash gas 604 is 94 wt. % isobutane, 5 wt. % ethylene, and 1 wt. % other components. A level or volume of fluff may be maintained in the flash chamber 602 to give additional residence time of the fluff in the chamber 602 to facilitate separation of liquid and vapor entrained in the porous fluff particles.

The flash gas 604 may be processed in solids removal equipment 606, such as cyclones, bag filters, etc., where entrained fluff solids are removed and returned to the flash chamber 602 or to downstream equipment, such as the purge column discussed below. The flash gas 604 may also travel through a de-oxygenation bed, for example. Furthermore, the flash gas 604 may be cooled or condensed in a heat exchanger 608 (e.g., shell-and-tube construction) prior to being recycled to the feed system 16 or fractionation system 30. To reduce steam consumption in the fractionation system 30, the flash gas 604 may bypass the fractionation system 30 and return more directly to the reactor 20 via the feed system 16. As discussed below, a portion of the flash gas (vapor and/or liquid) may be recycled through the fractionation system 30 if additional olefin-free diluent is needed.

As for the solids (polymer) in the flash chamber 602, they are withdrawn with a small amount of entrained diluent (and monomer) and sent to a purge column 610 via solids discharge 612. As will be appreciated by those of ordinary skill in the art, the solids discharge 612 conduit may include valve configurations that allow polymer to flow downward through the conduit while reducing the potential for vapor to flow between the purge column 610 and the flash chamber 602. For example, one or more rotary or cycling valves, fluff surge tanks, and so on, may be disposed on the solids discharge 612 conduit. Furthermore, a relatively small fluff chamber may also be disposed on the conduit. Traditionally, the fluff solids from the flash chamber has discharged into a lower pressure flash chamber, with the lower pressure flash gas requiring compression for recycle to fractionation system 30 and reactor 20. However, the newer technologies may provide for elimination of a low pressure flash and the associated compression (a significant consumer of electricity) of the low pressure gas, and discharge of the fluff solids from the flash chamber to the purge column 610. As indicated, such a discharge to the purge column 610 may include appropriate valve configurations, a surge chamber, or simply a conduit, and so on. Certain configurations provide for a continuous fluff discharge from the flash chamber, which may eliminate one or more cycling valves. Further, a level of solids may be maintained in the flash chamber 602 via a level control valve, providing for increased residence time of the solids in the flash chamber 602.

B. Purge Column

The primary solids feed to the purge column 610 is typically the solids discharge 612 (polyolefin fluff) that exits the flash chamber 602. A purpose of the purge column 610 is to remove residual hydrocarbon from the entering solids streams and to provide substantially-clean polymer fluff 614. The fluff 614 may be transported or conveyed to the extrusion/loadout system 36 for conversion to pellets 38, and for distribution and sale as polyolefin pellet resin to customers 40. In general, the treated polymer particles discharged from the purge column 610 as the polymer fluff 614 may be processed in a conventional finishing operation, such as a screw extruder, in the extrusion/load out system 36 (FIG. 1).

In the illustrated exemplary purge column system, nitrogen is circulated through purge column 610 to remove residual hydrocarbons via overhead discharge 616. This discharge 616 may be sent through a separation unit 618, such as a membrane recovery unit, pressure swing adsorption unit, refrigeration unit, and so forth, to recover nitrogen via nitrogen stream 620, and to discharge a separated hydrocarbon stream 622 as feed to the fractionation system 30. In the art, the separation unit 618 may be known as an Isobutane Nitrogen Recovery Unit (INRU). Moreover, fresh nitrogen 624 may be added to the nitrogen circuit to account for nitrogen losses in the purge column 610 system. Finally, it should be noted that the hydrocarbon stream 622 may beneficially provide feed to the fractionation system 30. For example, the hydrocarbon stream 622 discharging from the separation unit 618 makes available hydrocarbon feed that may be processed to give the olefin-free diluent used in catalyst preparation.

C. Alternate Configurations

As will be appreciated by those of ordinary skill in the art, a variety of configurations may be employed in the diluent/monomer recovery system 24. For example, the solids discharge 612 from the flash chamber 602 may be sent to another reactor (e.g., a gas phase reactor) instead of to the purge column 610 or to a low-pressure flash chamber. If discharged to another reactor, catalyst poison may not be injected upstream in the discharge 140, and, thus, residual active catalysts remain for further polymerization.

In another configuration, the purge column 610 may be eliminated from the recovery system 24 and combined with the downstream extruder feed tank. The separation unit 618 associated with the purge column 610 may be relocated to accommodate the extruder feed tank if desired. Thus, the high process pressure in the flash chamber 602 may be utilized to convey the fluff particles in solids discharge 612 to the extrusion/loadout system 36, eliminating a blower system (and associated electrical consumption) traditionally used to convey the fluff 614 to the extrusion/loadout system 36. In addition, the process pressure in the flash chamber 602 may be used to transport the fluff particles in a dense phase conveying arrangement, thus lowering the velocity of the flowing particles and reducing transport damage to the particles.

IV. Fractionation System

A. Diluent Purification

A purpose of the fractionation system 30 in polyolefin production is to purify the diluent discharged from the reactor system (e.g., from loop slurry reactor 110) and which is flashed/recovered in the diluent/monomer recovery subsystem 24. Initially, however, it should be noted, again, that the flashed diluent from the diluent/monomer recovery system 24 may instead be condensed and passed through a treater, such as a molecular sieve system, and directly recycled to the loop slurry reactor 110 (e.g., via a surge tank and pump), bypassing the fractionation system 30. The treater may remove undesirable components, such as the catalyst poison (e.g., water) injected upstream of the high pressure flash chamber 602 in the reactor discharge 140.

On the other hand, some or all of the recovered diluent from the diluent/monomer recovery system 24 may be sent through fractionation columns in the fractionation system 30 to remove heavy components, such as hexene, hexane, and oligomers. The columns may also remove light components, such as ethane that enters with the ethylene feedstock, nitrogen from the purge column 610, unreacted ethylene from the reactor 110, and so forth. In one arrangement, the fractionation subsystem initially removes heavy components in a heavies column (also called diluent recycle column, recycle isobutane column, dehexanizer, and the like) and then removes lighter components in a subsequent lights column (also called diluent purification column, isobutane purification column, dethanizer, and the like).

B. Heavies Column

To remove heavy components, the first column (heavies column or diluent recycle column) may discharge heavy components (e.g., hexene, hexane, and oligomers) out the bottom of the column to the flare. In certain configurations, the first column may also produce a side stream of diluent product (e.g., isobutane) that typically contains a measurable amount of light components (e.g., ethylene) but is acceptably recycled to the loop slurry reactor 110. In older configurations, this diluent product stream recycled to the reactor 110 may comprise the bulk of the recovered diluent received by the fractionation system 30 from the diluent/monomer recovery subsystem 24. The first column may also produce an overhead lights stream comprising primarily diluent, inert components, and ethylene, which may be partially condensed. Non-condensed components (e.g., nitrogen, ethylene) may be flared or recycled to the supplier, or may be vented as feed to the downstream second (lights) column. Condensed components of the overhead stream may be used as reflux to the first column and as reflux or feed to the second column, depending on the configuration employed at the particular polyolefin facility.

C. Lights Column

To remove light components, the second column (lights or diluent purification column), removes light components (e.g., ethylene, ethane, and nitrogen) to give a more pure diluent product which may be substantially olefin-free (with the heavy components already removed in the upstream column). The second column typically processes a smaller amount of diluent than the first column. The small stream of monomer-free (olefin-free) diluent may exit the bottom of the second column and be used in catalyst preparation, catalyst delivery, reactor flushes where catalyst is present, and so forth. As indicated, the availability of monomer-free diluent is beneficial for these catalyst-related functions because it may be important that olefin monomer not come into contact with catalyst outside of the reactor 110. Such contact could result in polymerization in undesirable parts of the process, which may plug equipment, cause operability problems, expend catalyst, and so forth.

D. Fractionation System Equipment and Process

Figure 8:
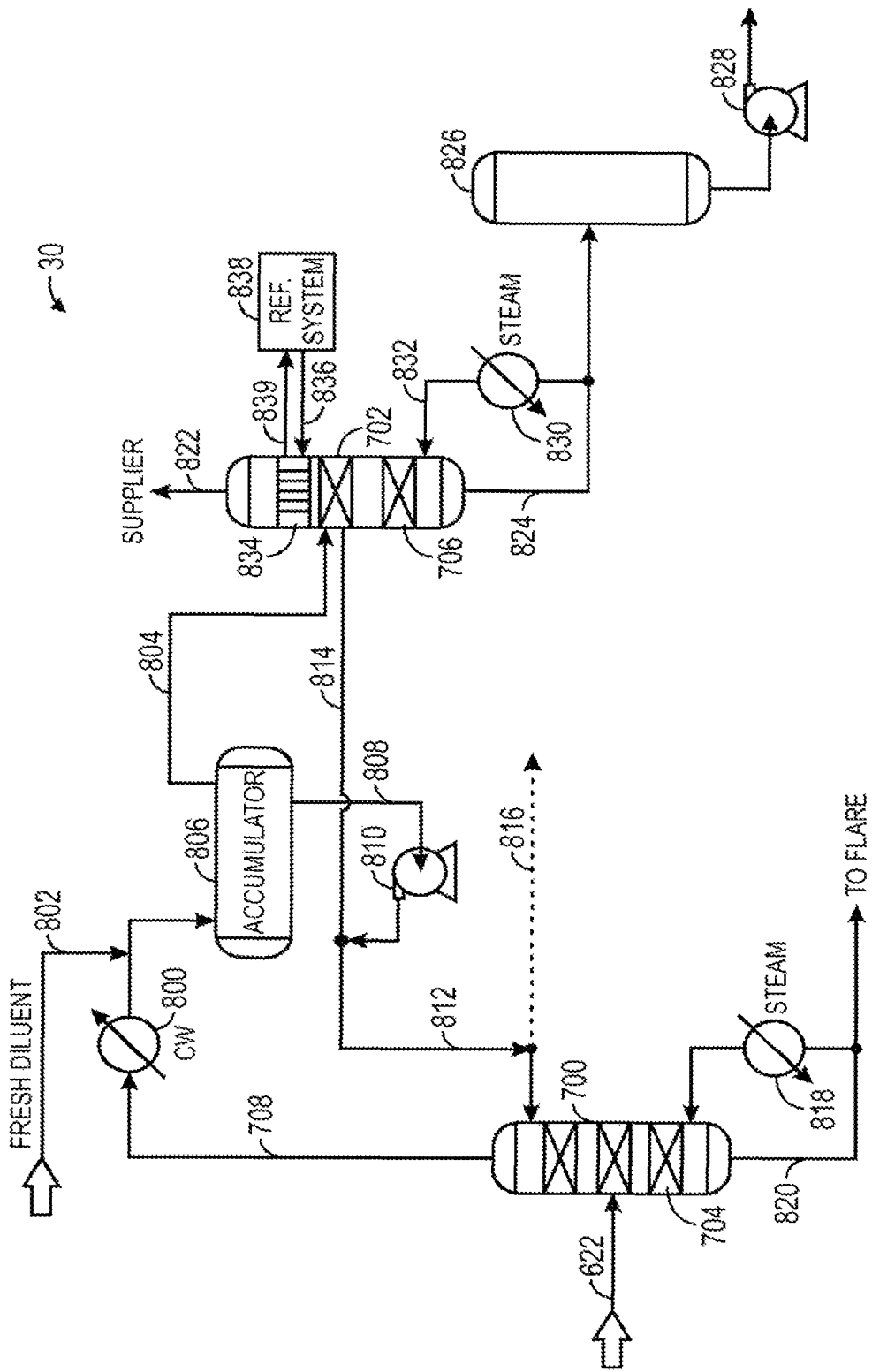
FIG. 8 is a process flow diagram of a fractionation system in accordance with on embodiment of the present techniques.

Referring to FIG. 8, a process flow diagram of the fractionation system 30 is depicted. The heavies column 700 and the lights column 702, each having appropriate internals 704 and 706 (e.g., packing, distillation trays, etc.), are illustrated. A flash gas stream, or in this illustration, the hydrocarbon stream 622 (primarily diluent) from the purge column 610 is fed to the lights column 700, which may operate typically at a pressure in the exemplary range of 125-175 psig and at a temperature in the exemplary range of 140-350° F. The lights column 700 separates unreacted monomer (e.g., ethylene) and lighter components (e.g., ethane, propane, nitrogen, etc.) in the overhead, as well as the heavier components such as hexane-1 and oligomers, from the diluent (e.g., isobutane) in the bottoms discharge. The overhead 708 from column 700 may be partially condensed in a condenser 800, such as a heat exchanger that utilizes a cooling medium (e.g., cooling tower water). Furthermore, it should be noted that fresh diluent 802 may added to the circuit downstream of the condenser 800.

The uncondensed vapors 804 may be separated in the accumulator 806 and fed to the lights column 702. In an alternate configuration, all or a portion of the vapors 804 may be vented to upstream supplier operations (e.g., olefin plant, petroleum refinery, etc.) or to the flare. The condensed liquid 808 from the accumulator 806 may be returned via pump 810 as reflux 812 to the heavies column 700. The liquid 808 may also be sent as reflux or feed 814 to the downstream lights column 702. Furthermore, the liquid 808, which is typically primarily diluent, may be recycled to the reactor 110, as indicated by reference numeral 816 (e.g., via a storage vessel and pump). Lastly, a steam reboiler 818 (e.g., shell and tube heat exchanger) vaporizes the heavy components 820 (e.g., hexene and oligomers) discharging from the bottom of column 700, with a portion of the components 820 discharged to the flare.

The lights column 702 may receive condensed components 814 and uncondensed components 804, and separate a light component stream 822 (e.g., nitrogen, ethane, ethylene) for recycle to the supplier, or as a vent to the flare. At the bottom of the column 702, "olefin-free" diluent 824, which is substantially free of olefin monomer, discharges from the column 702 and may be collected in an olefin-free diluent tank 826, for example. The olefin-free diluent may then be delivered via pump 828 (e.g., centrifugal pump, positive displacement pump, etc.) for reactor flushes and catalyst dilution. A steam reboiler 830 vaporizes a portion of the liquid diluent 824 discharging from the bottom of the lights column 702 to provide a return vapor flow 832 to the column 702. Furthermore, column 702 may be refluxed by a refrigerated condenser 834, with refrigerant 836 supplied from a refrigeration system 838. In the illustrated embodiment, the refrigeration system 838 also processes the refrigerant return 839. Exemplary refrigerants are liquid propylene, liquid propane, and the like. The overhead operating temperature of the column 702, in one example, is in the range –10° F. to 0° F., and the bottoms operating temperature is in the range of 145 to 170° F.

Flash gas 604 (FIG. 7), which discharges from the flash chamber 602 overhead, and which generally corresponds to the recycle stream 34 of FIG. 1, may be condensed and sent as recycle diluent directly to the reactor 110 via a surge tank, for example. Such direct recycle significantly reduces the load on the fractionation system, including the load on the heavies column 700 and lights column 702. Thus, these columns (and similar fractionation columns) and associated steam reboilers 818 and 830 may be significantly reduced in size (e.g., 5-20% of the conventional size) for the same capacity polyolefin plant where the flash 604 is not fractionated. In reducing the amount of the amount of reactor flushes, the present techniques reduce the demand for olefin-free diluent which may permit for more efficient construction and operation of the fractionation system 30.

While the techniques disclosed above may be susceptible to various modifications and alternative forms, specific embodiments have been shown by way of example in the drawings and have been described in detail herein. However, it should be understood that the techniques are not intended to be limited to the particular forms disclosed. Rather, the techniques encompass all modifications, equivalents, and alternatives falling within the spirit and scope of the techniques as defined by the following appended claims.

What is claimed is:

1. A method of operating a polyolefin manufacturing system, comprising:
   polymerizing olefin in a first reactor to form a first polyolefin;
   transferring the first polyolefin to a second reactor;
   polymerizing olefin in the second reactor to form a second polyolefin;
   discharging a product polyolefin from the second reactor, the product polyolefin comprising the first polyolefin and the second polyolefin; and
   operating the first reactor with a first reactor pressure relief system and the second reactor with a second reactor pressure relief system, both pressure relief systems configured to discharge to a flare system;
   wherein the polyolefin manufacturing system comprises a relief instrumented system (RIS) configured to direct at least one process interlock that mitigates an excess reaction of the first reactor or the second reactor, or both, as an overpressure relief.

2. The method of claim 1, wherein the first pressure relief system comprises a first pressure relief device, and wherein the second pressure relief system comprises a second pressure relief device.

3. The method of claim 2, wherein the first pressure relief device comprises a first pressure relief valve, and wherein the second pressure relief device comprises a second pressure relief valve.

4. The method of claim 1, wherein the first pressure relief system comprises a first pressure relief valve and a first rupture disk, and wherein the second pressure relief system comprises a second pressure relief valve and a second rupture disk.

5. The method of claim 1, wherein the olefin comprises ethylene, and wherein the first and second polyolefins comprises polyethylene.

6. The method of claim 1, wherein the at least one process interlock comprises injecting a kill fluid into at least the first reactor or the second reactor.

7. The method of claim 1, wherein the at least one process interlock comprises at least one of isolating a feed from the first reactor or isolating a feed from the second reactor.

8. The method of claim 1, wherein the at least one process interlock comprises activating a reactor pressure kill on a feed to the first reactor or isolating a feed to the second reactor.

9. The method of claim 1, wherein the at least one process interlock comprises two interlocks comprising one interlock to inject a kill fluid into at least one of the first reactor or the second reactor, and another interlock to isolate a first feed to the first reactor and to isolate a second feed to the second reactor.

10. The method of claim 1, wherein the first reactor and the second reactor are each configured with a maximum allowable working pressure (MAWP) that exceeds maximum feed pressure to the first reactor and the second reactor.

11. The method of claim 1, wherein centrifugal pumps that deliver feed to the first reactor and the second reactor are configured to deliver a maximum pressure less than a maximum allowable working pressure (MAWP) of the first reactor and the second reactor.

12. The method of claim 11, wherein the first reactor pressure relief system is configured to discharge through a first discharge piping to a flare header of the flare system, and the second reactor pressure relief system is configured to discharge through a second discharge piping to the flare header.

13. The method of claim 1, wherein the first reactor pressure relief system is configured to open in response to a first reactor pressure exceeding a first set pressure, and wherein the second reactor pressure relief system is configured to open in response to a second reactor pressure exceeding a second set pressure.

14. The method of claim 1, comprising at least one of opening the first reactor pressure relief system in response to a first reactor pressure exceeding a first set pressure, or opening the second pressure relief system in response to a second reactor pressure exceeding a second set pressure.

15. The method of claim 1, wherein the polyolefin manufacturing system further comprises a separation system configured to discharge the vapor to a flare header of the flare system.

16. The method of claim 1, wherein the polyolefin manufacturing system further comprises a separation system comprising a vessel.

17. The method of claim 1, wherein the polyolefin manufacturing system further comprises a separation system comprising a cyclone.

18. The method of claim 1, wherein the at least one process interlock comprises one interlock configured to inject a kill fluid into the first reactor and into the second reactor, and a second interlock isolating a first feed to the first reactor and to isolate on a second feed to the second reactor.

19. The method of claim 1, wherein the first reactor and the second reactor are each configured with a maximum allowable working pressure (MAWP) that exceeds a maximum feed pressure to the first reactor and the second reactor.

20. A polyolefin production system comprising:
a first reactor configured to polymerize olefin into a first polyolefin and discharge the first polyolefin to a second reactor;
the second reactor configured to polymerize olefin into a second polyolefin and discharge a product polyolefin comprising the first polyolefin and the second polyolefin;
a relief instrumented system (RIS) configured to direct at least one process interlock that mitigates an excess reaction of the first reactor and the second reactor as an overpressure relief;
a first pressure relief device disposed on the first reactor and configured to relieve to a flare system; and
a second pressure relief device disposed on the second reactor and configured to relieve to the flare system.

21. A polyolefin production system comprising:
a first reactor configured to polymerize olefin into a first polyolefin and discharge the first polyolefin to a second reactor;
the second reactor configured to polymerize olefin into a second polyolefin and discharge a product polyolefin comprising the first polyolefin and the second polyolefin;
a relief instrumented system (RIS) configured to direct at least one process interlock that mitigates an excess reaction of the first reactor and the second reactor as an overpressure relief demand;
a first pressure relief valve disposed on the first reactor and configured to relieve to a separation system; and
a second pressure relief valve disposed on the second reactor and configured to relieve to the separation system.

22. The polyolefin production system of claim 21, wherein the separation system is configured to collect polyolefin solids.

23. The polyolefin production system of claim 21, wherein the separation system is configured to discharge vapor to a flare system.

24. The polyolefin production system of claim 21, wherein the separation system comprises a vessel.

25. The polyolefin production system of claim 21, wherein the separation system comprises a cyclone.

* * * * *

UNITED STATES PATENT AND TRADEMARK OFFICE
CERTIFICATE OF CORRECTION

PATENT NO. : 9,718,948 B2  Page 1 of 1
APPLICATION NO. : 14/737020
DATED : August 1, 2017
INVENTOR(S) : Hottovy et al.

It is certified that error appears in the above-identified patent and that said Letters Patent is hereby corrected as shown below:

In the Specification

Column 2, Line 53, please change "customer" to -- customers --
Column 6, Line 22, please change "stirres" to -- stirrers --
Column 12, Line 53, please change "fir" to -- for --
Column 16, Line 24, please change "build up" to -- buildup --
Column 16, Line 51, please change "tank 138" to -- tank 300 --
Column 18, Line 48, please change "the entering" to -- entering the --
Column 20, Line 7, please change "subsystem 24" to -- system 24 --
Column 20, Line 42, please change "lights column 700" to -- heavies column 700 --
Column 20, Line 45, please change "lights column 700" to -- heavies column 700 --

Signed and Sealed this
Thirty-first Day of October, 2017

Joseph Matal
*Performing the Functions and Duties of the*
*Under Secretary of Commerce for Intellectual Property and*
*Director of the United States Patent and Trademark Office*